US009027886B1

(12) United States Patent
Mechels

(10) Patent No.: US 9,027,886 B1
(45) Date of Patent: May 12, 2015

(54) HIGH ALTITUDE ESCAPE POD

(76) Inventor: Roger J. Mechels, Broken Arrow, OK (US)

( * ) Notice: Subject to any disclaimer, the term of this patent is extended or adjusted under 35 U.S.C. 154(b) by 404 days.

(21) Appl. No.: 13/595,373

(22) Filed: Aug. 27, 2012

(51) Int. Cl.
| | |
|---|---|
| *B64D 17/72* | (2006.01) |
| *B64D 17/56* | (2006.01) |
| *B64D 25/08* | (2006.01) |
| *B64D 25/12* | (2006.01) |
| *B64D 19/00* | (2006.01) |
| *B64D 17/60* | (2006.01) |
| *B64D 1/14* | (2006.01) |

(52) U.S. Cl.
CPC .............. *B64D 25/08* (2013.01); *B64D 19/00* (2013.01); *B64D 2201/00* (2013.01); *B64D 1/14* (2013.01); *B64D 17/56* (2013.01); *B64D 17/725* (2013.01); *B64D 17/60* (2013.01); *B64D 25/12* (2013.01)

(58) Field of Classification Search
CPC ...... B64D 17/56; B64D 17/72; B64D 17/725; B64D 17/30; B64D 19/00; B64D 25/12; B64D 25/08; B64D 1/14; B64D 2001/00; B64D 17/60
USPC ............. 244/151 R, 147, 148, 149, 146, 143, 244/138 R, 100 A, 107; 2/456, 2.14, 462, 2/DIG. 3; 182/137
See application file for complete search history.

(56) References Cited

U.S. PATENT DOCUMENTS

| | | | | |
|---|---|---|---|---|
| 3,438,601 | A | * | 4/1969 | McIntyre ...................... 244/147 |
| 3,921,944 | A | * | 11/1975 | Morrison ................... 244/138 R |
| 4,191,275 | A | | 3/1980 | Mansfield, Jr. |
| 4,406,351 | A | | 9/1983 | Littlejohn et al. |
| 4,562,981 | A | | 1/1986 | Smith et al. |
| 4,709,782 | A | | 12/1987 | Lipinski |
| 5,080,305 | A | | 1/1992 | Stencel et al. |
| 5,150,767 | A | | 9/1992 | Miller |
| 5,568,902 | A | * | 10/1996 | Hurley, Jr. ................. 244/138 R |
| 5,620,058 | A | | 4/1997 | Forrester |
| 6,224,019 | B1 | | 5/2001 | Peterson et al. |
| 6,607,166 | B1 | * | 8/2003 | Pichkhadze et al. ...... 244/138 R |
| 6,651,934 | B2 | * | 11/2003 | Villinger ...................... 244/147 |
| 6,817,443 | B1 | | 11/2004 | Metz |
| 7,017,195 | B2 | * | 3/2006 | Buckman et al. ............ 2/DIG. 3 |
| 2009/0233505 | A1 | * | 9/2009 | Kwok ............................ 441/80 |

* cited by examiner

*Primary Examiner* — Tien Dinh
*Assistant Examiner* — Richard R Green
(74) *Attorney, Agent, or Firm* — Molly D. McKay

(57) ABSTRACT

A self inflating escape pod in the form of a vest to be worn by an individual to protect their body from a fall when they jump from a high rise building. The vest has a battery, altimeter, motion sensor, bladders and means for inflating the bladders. Removal of the vest from a storage cabinet activates the altimeter which activates the motion detector upon detecting a change in altitude. Upon sensing motion, the motion detector activates inflation of the bladders, forming a pod surround the individual's body. Air channels in the pod provide air to the individual and the pod is designed to accommodate different sizes of individuals. Beacons and reflectors on the pod assist in locating it, and one or more of the bladders will automatically deflate once the individual has stopped falling.

19 Claims, 4 Drawing Sheets

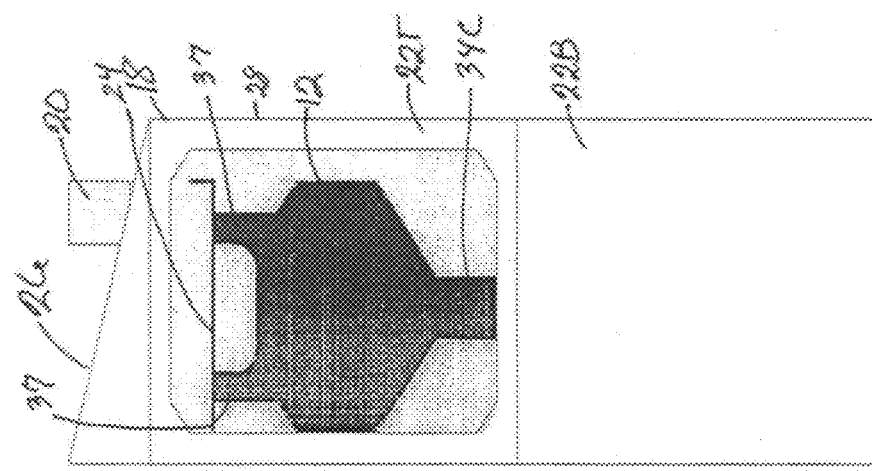
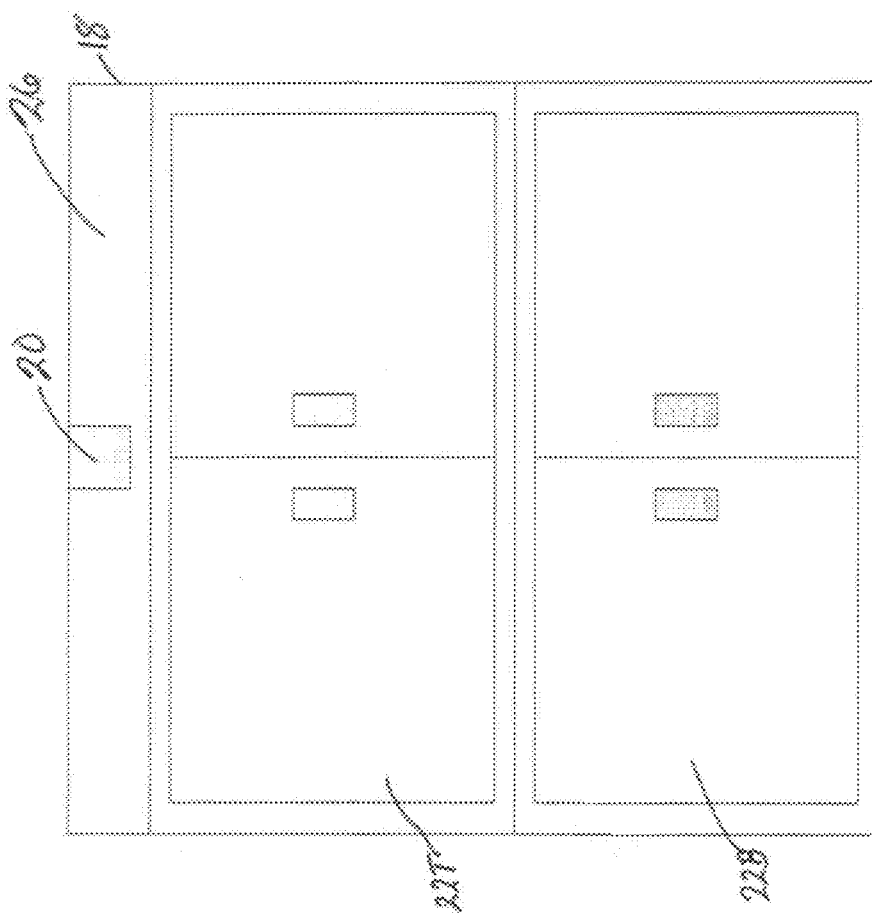

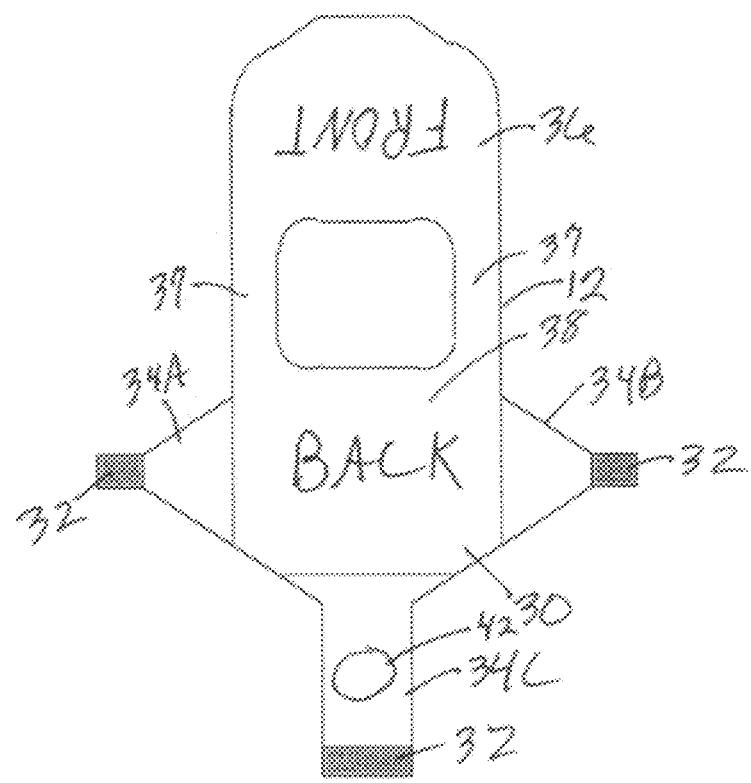
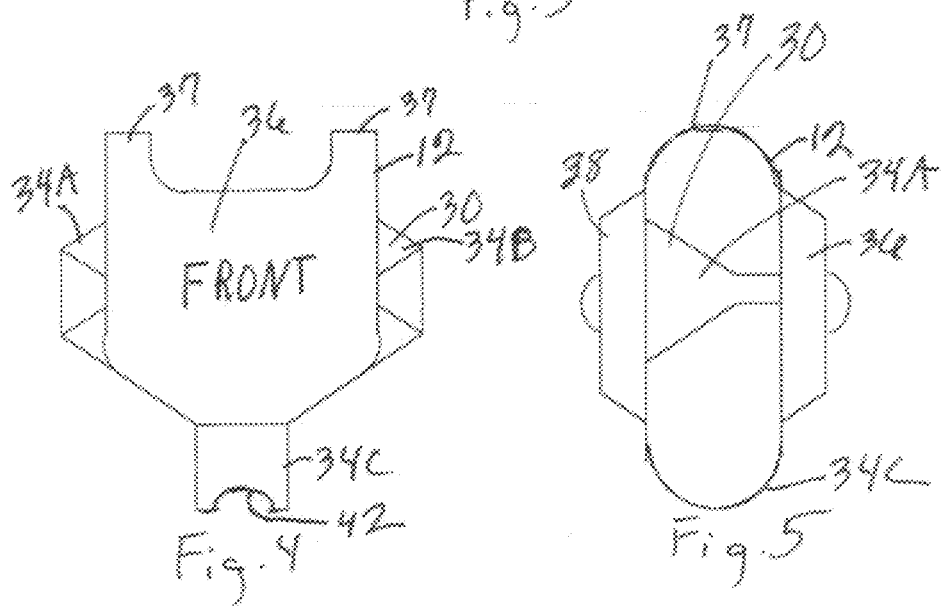

HIGH ALTITUDE ESCAPE POD

BACKGROUND OF THE INVENTION

1. Field of the Invention

The present invention relates to a device which allows a person the opportunity to exit a skyscraper or other high object quickly during an emergency, such as for example a fire in a high rise building. The device is a high altitude escape pod that can be quickly and easily strapped onto the body of a person with a vest and harness provided on the pod and which will self inflate and self deflate based on the pod sensing changes in altitude that would come about as a result of the person who was wearing the pod descending rapidly from an upper floor of a building or from another high location. This device might also be used by window washers or for the airline industry.

2. Description of the Related Art

Emergency escape by an individual from a burning high rise building or other high object has generally been by the individual travelling or being transported to the top of the building and being air lifted off of the top of the building, or alternately, by the individual travelling or being transported down a stairwell of the building to the ground. These two routes of escape can present difficulties since access to the rooftop of a high rise building is often prohibited due to safety issues, and movement down a stairwell may become physically blocked during an emergency or may be impossible for persons with certain disabilities.

As has happened tragically in some high rise building fires, such as for example in the Twin Towers fires, individuals who become trapped in a tall building and find it is impossible to escape any other way will sometimes resort to jumping out windows of upper floors of the building and falling to either death on the pavement below rather than face the inevitable pain and horror of death by fire or suffocation.

The present invention is designed to be worn by an individual who finds himself in a situation where he must exit an upper floor of a high rise building by jumping out a window. The invention is in the form of a vest that the individual can quickly and easily strap onto their body before jumping. It is important that the procedure for donning the vest be simple enough that anyone that can fasten an airline seatbelt will be able to operate this device with only minimal prior knowledge. Simplicity is important since an individual who will be putting on the vest will be under extreme stress and will be putting the vest on in a hurry.

The vest is provided with sensors that detect changes in altitude and motion. The sensors will, upon detection of a change in altitude and movement, automatically activate the vest to quickly self inflate a pod that expands to surround the body of the individual wearing the vest such that the pod will be fully inflated very soon after the individual jumps from the building and before the individual falls a significant distance. The pod will be sufficiently large to cushion the body as the pod strikes objects or strikes the ground below. It is the goal of the invention to provide sufficient cushioning and protection to the body of the individual as to prevent the fall from resulting in a fatality.

A plurality of the vests can be stored for long periods of time in specially designed cabinets. These cabinets would be located in areas of a high rise building where the vests would be easily accessible to occupants of the building if and when needed.

SUMMARY OF THE INVENTION

The present invention is an escape pod in the form of a vest that is designed to be worn by an individual who finds himself in a situation where he must exit an upper floor of a high rise building by jumping out a window or otherwise needs to protect their body from a fall.

A plurality of the vests can be stored for long periods of time in specially designed cabinets. These cabinets would be located in areas of a high rise building where the vests would be easily accessible to occupants of the building if and when needed. These cabinets can be opened with or without a key.

When opened with a key, as when the cabinets are opened for demonstrations or maintenance, nothing will happen. However, when the cabinets are opened without a key, this will indicate an emergency situation and an alarm within the cabinet will sound and a strobe light on the cabinet will flash to provide an indication of direction during an emergency involving low visibility.

It is envisioned that the cabinet or storage unit for the vests will consist of top and bottom compartments. Depending on the size of the vests, the cabinets will be able to hold a minimum of twelve vests, i.e. with six vests in the top compartment and six in the bottom compartment.

The vests will hang within the cabinet on arms that are turned upward at the end to prevent the vests from sliding off the arms when the cabinet is moved, thereby preventing accidental activation.

The cabinets will have slanted tops to prevent anything from being stacked upon them that might obstruct the view of an emergency strobe located on the top of the cabinet. The purpose of the strobe is to allow individuals to find the cabinets in a dark building. In addition to the strobe, each cabinet will be equipped with a klaxon alarm. Both the strobe and alarm will be operated by battery so that the operation will not be affected by power failure. The vests will also be provided with batteries. Because the cabinet batteries and the vest batteries will have no drain on them unless the cabinet and vests are accessed, the batteries should last a long time, and may be of a type that are rechargeable and are constantly being recharged by electricity provided by line current.

Thus the vests will be thus stored in an upright orientation within the storage cabinets, with one side of each vest facing the front of the cabinet. There will be a pin that must be pulled out to activate the vest. The pin is attached to a lanyard, which in turn is attached to the cabinet. When the vest is removed from the cabinet, the pin is automatically removed by the lanyard and the battery within the vest will activate the altimeter that is also located within the vest, as will be explained more fully hereafter.

The vest contains a harness that is similar to a parachute harness in structure, with buckles and elongated straps to pull tight for a snug fit around an individual's body. The buckles will fasten into the front of the vest. Each vest has a clearly marked front and back which contain packs that will initially house the necessary canisters, bladders, batteries, sensors and detectors. The vest can be quickly and easily strapped onto the body of an individual before the individual jumps from the building. Additionally, the crotch belt will have a cut-out area to comfortably accommodate male genitalia.

As previously described, batteries are located within the packs provided on the vest. The batteries are for activating the device. As long as the device remains inactive, there is no drain on the batteries. Thus, with the vests stored in a cabinet, the batteries should last for many years. Even after activation, the vest will not require a lengthy service life because emergency conditions are generally short-lived.

As the vests are removed from the cabinet, a lanyard that connects the vests to the cabinet will automatically remove an activation pin on each vest. When this happens, the battery within the vest will activate only an altimeter on the vest. The altimeter is an instrument that measures the altitude of an object above a defined level, i.e. usually ground level. The altimeter will control activation of the other devices on the vest. Ideally, the altimeter can detect the rate or speed at which it is dropping or descending. And when the altimeter detects a certain preset rate of descent, the altimeter activates a motion sensor provided on the vest. If the altimeter is not capable of detecting the rate of descent, then a standard will be set of 15 feet of descent that will then trigger activation of the motion sensor. A 15 feet descent before activation of the motion sensor will provide for the situation where the person wearing the vest descends to the next lower floor before jumping.

The motion sensor will be set to cover a field of vision of 180 degrees and motion sensed by the motion sensor will activate the bladders of the pod. Use of the motion sensor to activate the bladders will help to prevent premature activation of the bladders which are contained within the vest.

The packs provided on the front and back of the vest are provided with the altimeter or other suitable altitude sensor that detect changes in altitude that will occur upon the individual jumping. The sensor will, upon detection of a change in altitude, automatically activate the motion sensor. The motion sensor, will in turn, upon sensing motion, automatically activate gas canisters or other suitable means provided on the vest for rapidly self inflating a pod contained within the vest. Examples of suitable gases or gas generating chemicals that could be employed would include, but would not be limited to, sodium azide, nitroguanidine, helium, carbon dioxide, etc. It may be desirable to have the upper bladders or portions of the pod to be inflated with helium in an attempt to keep the individual upright as they fall.

The inflated bladders form a pod that rapidly expands to surround the body of the individual wearing the vest. The pod will inflate quickly after the individual jumps from the building and will be fully inflated before the individual falls a significant distance. The pod, which will consist of one or more inflatable bladders, will be sufficiently large and of appropriate shape to cushion the body as the pod strikes objects or strikes the ground below. The pod does not have to be round in shape; an oval shape may be preferable.

The pods are not airtight. There may be air channels built into them, if desired.

The area within the pod which surrounds the individual's face and legs will provide space for air to reach the individual and for restricted movement of the legs. The face area and leg area of the individual will be restrained by netting or mesh within cut out portions of the pod in these areas. The netting or mesh will provide support for these areas of the body while the body is surrounded by the pod and will restrain movement of the body while providing greater flexibility for different sizes of individuals that may use the vest. It is the goal of the invention to provide sufficient cushioning and protection to the body of the individual as to prevent the fall from resulting in a fatality.

The bladders will remain inflated until they are manually deflated, or the altimeter indicates ground level, or there is no movement sensed by the motion detectors for a period of twenty seconds. Once the individual has come to rest, motion sensors provided on the vest will sense movement has ceased for approximately twenty seconds and will automatically gently deflate the bladders of the pod. If the pod self-deflates, it will be a slow deflation through several small outlets provided in the bladders of the pod. It may be desirable to have an inner or smaller bladder that does not automatically deflate, but must be manually deflated by the individual or by emergency personnel. This non-self deflating bladder would provide a means to keep the individual afloat in the case of the pod being deployed over a body of water.

Although it would be desirable for the bladders to be completely transparent, it is desirable that the bladders be at least semi-transparent so that the occupant of the pod can see where they have landed and whether they have any situations to deal with upon deflation. For example, they could be landing on the roof of another building or on a freeway in the dark. For that reason, reflectors will also be provided on the pods to make the pods more visible at night or in other similar low visibility situations. Ideally, the altimeter in conjunction with the motion detector will trigger the deflation process when no further downward movement is detected or when no further movement is detected.

Additionally, the vest will be provided with at least one type of locator beacon that will assist emergency personnel in quickly locating the individual and any stray pods so that emergency care can be rendered to the individual, as may be required.

In the event that the pod lands on water, it will detect motion and will not immediately deflate or will deflate only those bladders that are automatically self-deflating.

BRIEF DESCRIPTION OF THE DRAWINGS

FIG. 1 is front plan view of a cabinet for storing vests of the present invention before they are deployed.

FIG. 2 is side view of the cabinet of FIG. 1 that has been cut away to show the vest being stored within an upper compartment of the cabinet.

FIG. 3 is a plan view of a vest showing the opening for the head and straps that secure around an individual's body.

FIG. 4 is front view of the vest of FIG. 3 showing the vest as it would be secured around a person's body with the three straps secured to the front of the vest.

FIG. 5 is side view of the vest of FIG. 4 showing the front and rear packets of the vest which contain the bladders, sensors, batteries and other functional elements.

DETAILED DESCRIPTION OF THE PREFERRED EMBODIMENT

Figure 6:
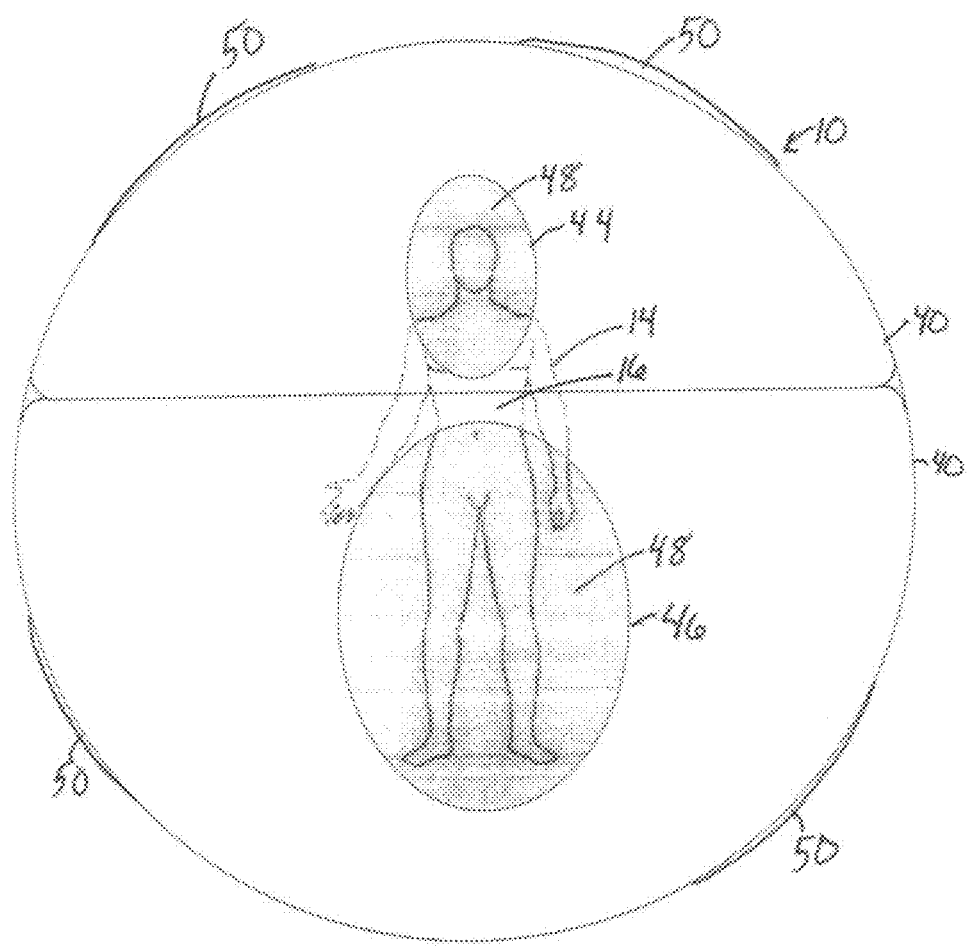
FIG. 6 is a front plan view of the pod that has been deployed from the vest of FIGS. 3-5 to surround the body of an individual who is wearing the vest.
Figure 7:
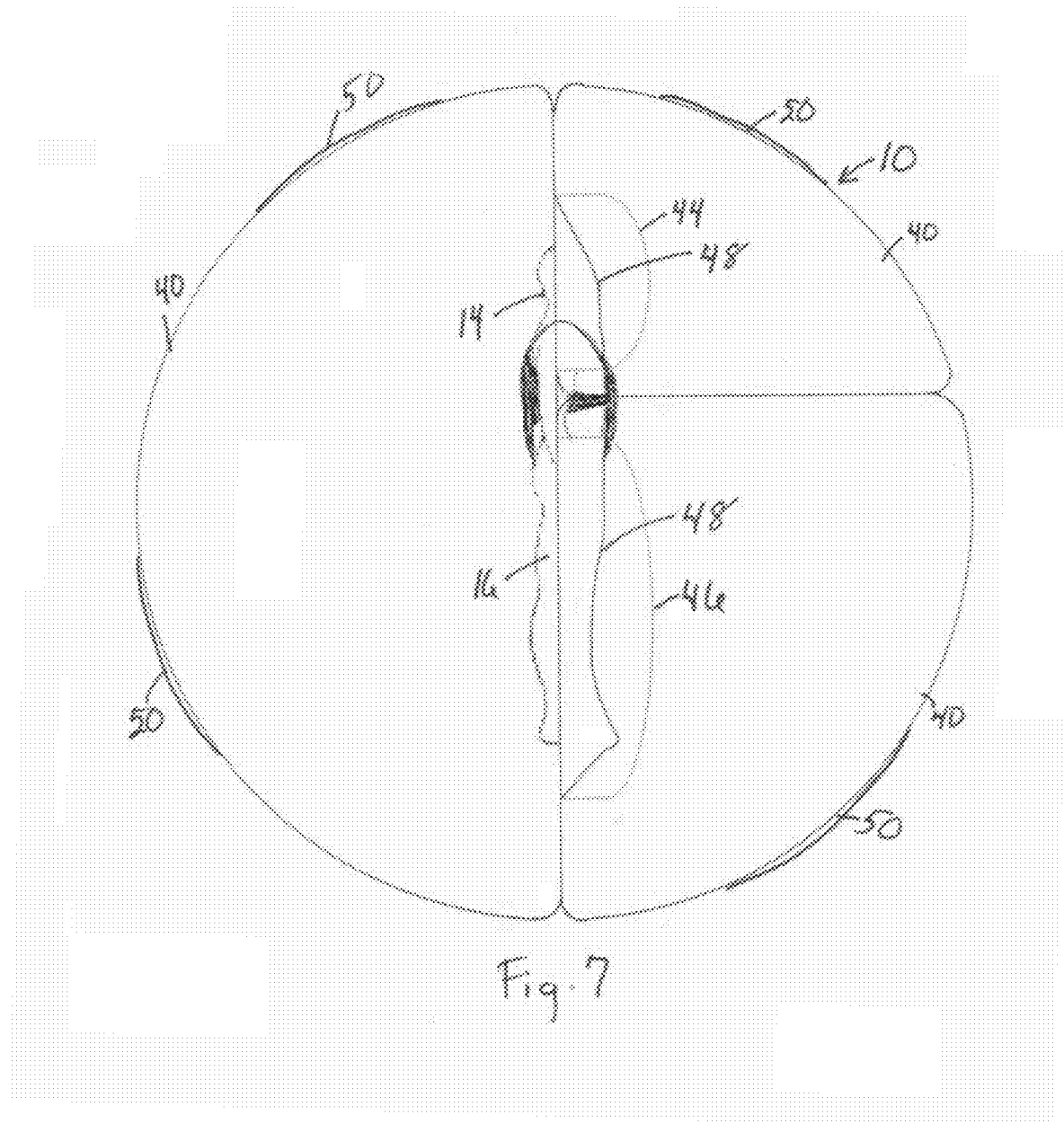
FIG. 7 is a cut away side view of the pod of FIG. 6 showing how the individual's body is supported within the pod.

Referring now to the drawings and initially to FIGS. 6 and 7, there is illustrated a high altitude escape pod 10 constructed in accordance with a preferred embodiment of the present invention. FIG. 7 shows the pod 10 as it would appear when deployed from a vest 12 that is part of the pod 10 and that is worn by an individual 14.

Referring also to FIGS. 3, 4 and 5, the invention is an escape pod 10 in the form of a vest 12 that is designed to be worn by an individual 14 who finds himself in a situation where he must exit an upper floor of a high rise building or other high object by jumping out a window or who otherwise needs to protect their body 16 from a fall.

As illustrated in FIGS. 1 and 2, a plurality of the vests 12 can be stored for long periods of time in specially designed cabinets 18. These cabinets 18 would be located in areas of a high rise building where the vests 12 would be easily accessible to occupants of the building if and when needed. These cabinets 18 can be opened with or without a key. When opened with a key, as when the cabinets 18 are opened for demonstrations or maintenance, nothing will happen. However, when the cabinets 18 are opened without a key, this will indicate an emergency situation and an alarm within the cabinet 18 will sound and a strobe light 20 on the cabinet 18 will flash to provide an indication of direction during an emergency involving low visibility.

It is envisioned that the storage unit for the vests 12 will consist of top and bottom compartments 22T and 22B, respectively. Depending on the size of the vests 12, the cabinets 18 will be able to hold a minimum of twelve vests 12, i.e. with six vests 12 in the top compartment 22T and six in the bottom compartment 22B.

As shown in FIG. 2, the vests 12 will hang within the cabinet 18 on arms 24 that are turned upward at the end to prevent the vests 12 from sliding off the arms 24 when the cabinet 18 is moved, thereby preventing accidental activation.

The cabinets 18 will have slanted tops 26 to prevent anything from being stacked upon them that might obstruct the view of the emergency strobe light 20 located on the top of the cabinet 18. The purpose of the strobe light 20 is to allow individuals 14 to find the cabinets 18 in a dark building. In addition to the strobe light 20, each cabinet 18 will be equipped with a klaxon alarm. Both the strobe 20 and alarm will be operated by batteries located within the cabinet 18 so that the operation will not be affected by power failure. Because the batteries will have no drain on them unless the cabinet 18 and vests 12 are accessed, the batteries should last a long time, and may be of a type that are rechargeable and are constantly being recharged by electricity provided by line current within the building where the cabinet 18 is located.

Thus the vests 12 will be thus stored in an upright orientation within the storage cabinets 18, with one side of each vest 12 facing the front 28 of the cabinet 18, as illustrated in FIG. 2. There will be an activation pin that must be pulled out to activate the vest 12. The pin is to be attached to a lanyard, which in turn is attached to the cabinet 18. When the vest 12 is removed from the cabinet 18, the pin is automatically removed by the lanyard, which activates a battery and an altimeter located within the vest 12, as will be explained more fully hereafter.

Referring again to FIGS. 3, 4 and 5, the vest 12 includes a harness 30 that is similar to a parachute harness in structure, with buckles 32 located at the ends of elongated strap 34A, 34B, and 34C so that the straps 34A, 34B, and 34C can be pulled tight for a snug fit around the body 16 of an individual 14. The buckles 32 will fasten into a front 36 of the vest 12. Each vest 12 has clearly marked front 36 and back 38 with shoulder straps 37 connecting the front 36 to the back 38. The front 36 and back 38 of the vest 12 are packs that initially house the necessary gas canisters, bladders 40, batteries, sensors and detectors. The vest 12 can be quickly and easily strapped onto the body 16 of an individual 14 before the individual 14 jumps from the building. Additionally, the crotch belt 34C will have a cut-out area 42 to comfortably accommodate male genitalia.

Batteries are located within the front and back packs 36 and 38 provided on the vest 12. The batteries are for activating the pod 10. As long as the vests 12 remain inactive, there is no drain on the batteries. Thus, with the vests 12 stored in a cabinet 18, the batteries should last for many years. Even after activation, the vest 12 will not require a lengthy service life because emergency conditions are generally short-lived.

As the vests 12 are removed from the cabinet 18, a lanyard that connects the vests 12 to the cabinet 18 will automatically remove an activation pin on each vest 12. When this happens, only an altimeter on the vest 12 is activated. The altimeter is an instrument that measures the altitude of an object above a defined level, i.e. usually ground level. The altimeter will control activation of the motion sensor on the vest 12. Ideally, the altimeter can detect the rate or speed at which it is dropping or descending. And when the altimeter detects a certain preset rate of descent, the altimeter activates a motion sensor provided on the vest 12. If the altimeter is not capable of detecting the rate of descent, then a standard will be set of 15 feet of descent that will then trigger activation of the motion sensor. A 15 feet descent before activation of the motion sensor will provide for the situation where the person wearing the vest 12 descends to the next lower floor before jumping. Use of the motion sensor to activate the bladders 40 will help to prevent premature activation of the bladders which are contained within the vest 12. The motion sensor will be set to cover a field of vision of 180 degrees.

The front and back packs 36 and 38 provided on the vest 12 are provided with the altimeter or other suitable altitude sensor that detect changes in altitude that will occur upon the individual 14 jumping. The altitude sensor will, upon detection of a change in altitude, automatically activate the motion sensor and upon sensing motion, the motion sensor will automatically activate gas canisters or other suitable means provided on the vest 12 for rapidly self inflating bladders 40 of the pod 10 that are contained within the vest 12. Examples of suitable gases or gas generating chemicals that could be employed would include, but would not be limited to, sodium azide, nitro guanidine, helium, carbon dioxide, etc. It may be desirable to have the upper bladders 40 or portions of the pod 10 to be inflated with helium in an attempt to keep the individual 14 upright as they fall. Also, some of the bladders 40 may be smaller or may be designed so that they do not automatically deflate.

Referring again to FIGS. 6 and 7, the inflated bladders 40 for a pod 10 rapidly expands to surround the body 16 of the individual 14 wearing the vest 12. The pod 10 will inflate quickly after the individual 14 jumps from the building and will be fully inflated before the individual 14 falls a significant distance. The pod 10, which will consist of one or more inflatable bladders 40, will be sufficiently large and of appropriate shape to cushion the body 16 as the pod 10 strikes objects or strikes the ground below. The pod 10 does not have to be round in shape; an oval shape may be preferable.

The pod 10 is not airtight. There may be air channels built into the pod 10, if desired.

The area within the pod 10 which surrounds the face and legs of an individual 14 will provide space for air to reach the individual 14 and for restricted movement of the legs. The pod 10 will be provided with cut out portions 44 and 46 in the face area and leg area, respectively, and the face and legs of the individual 14 will be restrained by netting or mesh 48 within those cut out portions 44 and 46 of the pod 10. The netting or mesh 48 will provide support for these areas of the body 16 while the body 16 is surrounded by the pod 10 and will restrain movement of the body 16 while providing greater flexibility for the pod 10 to accommodate different sizes of individuals that may use the vest 12. It is the goal of the invention to provide sufficient cushioning and protection to the body 16 of the individual 14 as to prevent the fall from resulting in a fatality.

The bladders 40 will remain inflated until they are manually deflated, or until the altimeter indicates ground level, or there is no movement sensed by the motion detectors for a period of twenty seconds. As was previously described, it may be desirable to have at least one bladder 40 that is not self-deflating. Once the individual 14 has come to rest, the motion sensor provided on the vest 12 will sense movement has ceased for twenty seconds and will automatically gently deflate the bladders of the pod 10. If the pod 10 self-deflates, it will be a slow deflation through several small outlets provided in the bladders of the pod 10.

Although it would be desirable for the bladders 40 to be completely transparent, it is desirable that the bladders 40 be at least semi-transparent so that the occupant of the pod 10 can see where they have landed and whether they have any situations to deal with upon deflation. For example, they could be landing on the roof of another building or on a freeway in the dark. For that reason, reflectors 50 will also be provided on the exterior of the pod 10. Ideally, the altimeter will trigger the deflation process on those bladders 40 that are self deflating when no further downward movement is detected by the altimeter.

Additionally, the vest 12 will be provided with at least one type of locator beacon that will assist emergency personnel in quickly locating the individual 14 and any stray pods 10 so that emergency care can be rendered to the individual 14, as may be required.

In the event that the pod 10 lands on water, the motion detector will detect motion and will not immediately deflate. Even if the motion detector or altimeter cause the bladders to deflate upon landing on water, and at least one non-self deflating bladder will remain inflated until it is manually deflated so that it will serve as a floatation device for the individual 14.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A high altitude escape pod to be worn by an individual who must jump from a high location comprising:
    a vest with straps for securing the vest to the body of an individual, a device for sensing altitude provided on the vest, a motion detector provided on the vest, said motion detector activated by the device for sensing altitude upon the device for sensing altitude sensing a change in altitude, at least one bladder provided on the vest, means for inflating the bladders upon the motion detector sensing movement such that the inflated bladders from a protective pod around the individual's body to cushion the body as the pod strikes objects,
    a storage cabinet for housing a plurality of the vests, and
    an activation pin provided attached on the cabinet which automatically disengages from the vest upon the vest being removed from the cabinet, and
    said disengagement of the in from the vest activating said device for sensing altitude.

2. A high altitude escape pod according to claim 1 further comprising:
    said storage cabinet provided with a battery powered alarm and a battery powered strobe light that are both activated when the cabinet is opened without a key.

3. A high altitude escape pod according to claim 2 wherein the strobe light is located on a sloped top of the cabinet.

4. A high altitude escape pod according to claim 1 further comprising:
    an arm provided in each compartment of the cabinet on which the vests will hang when in storage, and each arm turned upward at the end to prevent the vests from sliding off of the arms accidentally.

5. A high altitude escape pod according to claim 1 wherein said activation pin is attached to a lanyard which is secured to said storage cabinet such that the pin is pulled out of the vest and is retained by the lanyard when the vest is removed from the storage cabinet.

6. A high altitude escape pod according to claim 1 wherein the straps for securing the vest to the body of an individual further comprise:
    elongated straps attached to a back of the vest which can be pulled around the body of an individual, and each elongated strap provided with a buckle on a free end of the strap for securing to the front of the vest.

7. A high altitude escape pod according to claim 6 wherein one of the straps for securing the vest to the body is a crotch belt this is provided with a cut-out area therein for accommodating male genitalia.

8. A high altitude escape pod according to claim 1 further comprising:
    the front and back of said vest are provided with packs for holding said at least one bladder and said means for inflating the bladders.

9. A high altitude escape pod according to claim 1 wherein the motion detector covers a wide field of vision.

10. A high altitude escape pod according to claim 1 wherein the bladders are inflated with a gas.

11. A high altitude escape pod according to claim 10 wherein the gas used to inflate the bladders is selected from the following list:
    sodium azide, nitro guanidine, helium, and carbon dioxide.

12. A high altitude escape pod according to claim 1 wherein at least two different gases are employed to inflate the bladders.

13. A high altitude escape pod according to claim 1 further comprising:
    all but at least one of the bladders is self-deflating.

14. A high altitude escape pod according to claim 1 further comprising:
    the pod being provided with air channels.

15. A high altitude escape pod according to claim 1 further comprising:
    the pod provided with cut out portions in the face area and leg area, said cut out portions provided with netting for supporting and restraining the individual's face and legs within the cut out portions.

16. A high altitude escape pod according to claim 1 further comprising:
    means for automatically deflating the bladders when the vest is no longer falling.

17. A high altitude escape pod according to claim 16 wherein the means for automatically deflating the bladders when the vest is no longer falling further comprise:
    the device for sensing altitude ceases to sense change in altitude and the motion detector senses no movement for a preselected period of time.

18. A high altitude escape pod according to claim 1 further comprising:
    said bladders being at least partially transparent.

19. A high altitude escape pod according to claim 1 further comprising:
    reflectors provided on the exterior of the bladders, and
    a locator beacon on the vest that is activated in conjunction with inflation of the bladders.

* * * * *